(12) United States Patent
Tran

(10) Patent No.: US 11,829,767 B2
(45) Date of Patent: *Nov. 28, 2023

(54) REGISTER SCOREBOARD FOR A MICROPROCESSOR WITH A TIME COUNTER FOR STATICALLY DISPATCHING INSTRUCTIONS

(71) Applicant: Simplex Micro, Inc., San Jose, CA (US)

(72) Inventor: Thang Minh Tran, Tustin, CA (US)

(73) Assignee: Simplex Micro, Inc., Austin, TX (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/672,622

(22) Filed: Feb. 15, 2022

(65) Prior Publication Data

US 2023/0244493 A1 Aug. 3, 2023

Related U.S. Application Data

(63) Continuation-in-part of application No. 17/588,315, filed on Jan. 30, 2022.

(51) Int. Cl.
*G06F 9/38* (2018.01)
*G06F 1/12* (2006.01)

(52) U.S. Cl.
CPC ............. *G06F 9/3838* (2013.01); *G06F 1/12* (2013.01); *G06F 9/3848* (2013.01)

(58) Field of Classification Search
CPC ..................... G06F 9/3836; G06F 9/30145
See application file for complete search history.

(56) References Cited

U.S. PATENT DOCUMENTS

| | | |
|---|---|---|
| 5,185,868 A | 2/1993 | Tran |
| 5,251,306 A | 10/1993 | Tran |
| 5,655,096 A | 8/1997 | Branigin |
| 5,699,536 A | 12/1997 | Hopkins et al. |
| 5,802,386 A | 9/1998 | Kahle et al. |
| 5,809,268 A | 9/1998 | Chan |
| 5,835,745 A | 11/1998 | Sager et al. |
| 5,860,018 A | 1/1999 | Panwar |
| 5,881,302 A | 3/1999 | Omata |
| 5,958,041 A | 9/1999 | Petolino, Jr. et al. |

(Continued)

FOREIGN PATENT DOCUMENTS

| | | |
|---|---|---|
| EP | 0840213 A2 | 5/1998 |
| EP | 0959575 A1 | 11/1999 |
| WO | 0010076 A1 | 2/2000 |

OTHER PUBLICATIONS

Choi, W., Park, SJ., Dubois, M. (2009). Accurate Instruction Pre-scheduling in Dynamically Scheduled Processors. In: Stenström, P. (eds) Transactions on High-Performance Embedded Architectures and Compilers I. Lecture Notes in Computer Science, vol. 5470 Springer, Berlin, Heidelberg. pp. 107-127. (Year: 2009).

(Continued)

*Primary Examiner* — Zachary K Huson
(74) *Attorney, Agent, or Firm* — Appleton Luff

(57) ABSTRACT

A processor includes a time counter and a register scoreboard and operates to statically dispatch instructions with preset execution times based on a write time of a register in the register scoreboard and a time count of the time counter provided to an execution pipeline.

27 Claims, 5 Drawing Sheets

(56) References Cited

U.S. PATENT DOCUMENTS

| | | | |
|---|---|---|---|
| 5,961,630 | A | 10/1999 | Zaidi et al. |
| 5,964,867 | A | 10/1999 | Anderson et al. |
| 5,996,061 | A | 11/1999 | Lopez-Aguado et al. |
| 5,996,064 | A | 11/1999 | Zaidi et al. |
| 6,016,540 | A | 1/2000 | Zaidi et al. |
| 6,035,393 | A | 3/2000 | Glew et al. |
| 6,065,105 | A | 5/2000 | Zaidi et al. |
| 6,247,113 | B1 | 6/2001 | Jaggar |
| 6,304,955 | B1 | 10/2001 | Arora |
| 6,425,090 | B1 | 7/2002 | Arimilli et al. |
| 6,453,424 | B1 | 9/2002 | Janniello |
| 7,069,425 | B1 | 6/2006 | Takahashi |
| 7,434,032 | B1 * | 10/2008 | Coon .................... G06F 9/3851 712/217 |
| 8,166,281 | B2 | 4/2012 | Gschwind et al. |
| 9,256,428 | B2 | 2/2016 | Heil et al. |
| 11,132,199 | B1 | 9/2021 | Tran |
| 11,144,319 | B1 | 10/2021 | Battle et al. |
| 11,163,582 | B1 | 11/2021 | Tran |
| 11,204,770 | B2 | 12/2021 | Tran |
| 11,263,013 | B2 | 3/2022 | Tran |
| 2003/0135712 | A1 | 7/2003 | Theis |
| 2006/0095732 | A1 | 5/2006 | Tran et al. |
| 2006/0218124 | A1 | 9/2006 | Williamson et al. |
| 2006/0259800 | A1 | 11/2006 | Maejima |
| 2006/0288194 | A1 * | 12/2006 | Lewis .................... G06F 9/3869 712/220 |
| 2007/0260856 | A1 | 11/2007 | Tran et al. |
| 2011/0099354 | A1 | 4/2011 | Takashima et al. |
| 2013/0151816 | A1 * | 6/2013 | Indukuru .............. G06F 9/3857 712/206 |
| 2013/0346985 | A1 * | 12/2013 | Nightingale ........ G06F 15/7871 718/102 |
| 2014/0082626 | A1 | 3/2014 | Busaba et al. |
| 2015/0227369 | A1 | 8/2015 | Gonion |
| 2016/0092238 | A1 | 3/2016 | Codrescu et al. |
| 2016/0371091 | A1 | 12/2016 | Brownscheidle et al. |
| 2017/0357513 | A1 | 12/2017 | Ayub et al. |
| 2018/0196678 | A1 | 7/2018 | Thompto |
| 2020/0004543 | A1 | 1/2020 | Kumar et al. |
| 2021/0026639 | A1 | 1/2021 | Tekmen et al. |

OTHER PUBLICATIONS

Diavastos, Andreas & Carlson, Trevor. (2021). Efficient Instruction Scheduling using Real-time Load Delay Tracking. (Year: 2021).

J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).

Written Opinion of the International Searching Authority, PCT/S2022/052185.

Written Opinion of the International Searching Authority, PCT/US2023/018970.

Written Opinion of the International Searching Authority, PCT/US2023/018996.

* cited by examiner

Resource Matrix

| Time | Rd buses | Wr buses | ALU | LS | MUL | DIV | BEU |
|------|----------|----------|-----|-----|-----|-----|-----|
| 127  |          |          |     |     |     |     |     |
| 126  |          |          |     |     |     |     |     |
| .    |          |          |     |     |     |     |     |
| 26   |          |          |     |     |     |     |     |
| 25   |          | 2        | 2   | 1   | 1   | 0   | 1   |
| 24   | 1        |          |     |     |     |     |     |
| .    |          |          |     |     |     |     |     |
| 5    |          |          |     |     |     |     |     |
| .    |          |          |     |     |     |     |     |
| 1    |          |          |     |     |     |     |     |
| 0    |          |          |     |     |     |     |     |

— write time (→ row 25, Wr buses)
— execute time (→ row 25, ALU)
— read time (→ row 24, Rd buses)
— time count (→ row 5)

REGISTER SCOREBOARD FOR A MICROPROCESSOR WITH A TIME COUNTER FOR STATICALLY DISPATCHING INSTRUCTIONS

RELATED APPLICATIONS

This application claims priority to U.S. patent application Ser. No. 17/588,315, filed Jan. 30, 2022, and entitled "Microprocessor with Time Counter for Statically Dispatching Instructions," which application is hereby incorporated by reference in its entirety.

BACKGROUND

Technical Field

The present invention relates to the field of computer processors. More particularly, it relates to issuing and executing instructions based on a time count in a processor where the processor consists of a general-purpose microprocessor, a digital-signal processor, a single instruction multiple data processor, a vector processor, a graphics processor, or other type of microprocessor which executes instructions.

Technical Background

Processors have become increasingly complex by chasing small increments in performance, at the expense of power consumption and semiconductor chip area. The approach in out-of-order (OOO) superscalar microprocessors has remained basically the same for the last 25-30 years, with much of the power dissipation arising from the dynamic scheduling of instructions for execution from reservation stations or central windows. Designing an OOO superscalar microprocessor has consequently become a huge undertaking. Hundreds of different instructions can be issued to the execution pipeline where the data dependencies must be resolved and arbitrated for execution by a large number of functional units. The result data from the functional units must be again arbitrated for the write buses to write back results to the register file. If the data cannot be written back to the register file, then the result data are kept in temporary registers and a complicated stalling procedure needs to be performed for the execution pipeline.

An alternative to OOO superscalar processors is very-long-instruction-word (VLIW) processors. These have diminished interest in the industry because of the need for a complex compiler and their relatively weak performance.

Thus, there is a need for an OOO superscalar microprocessor which consumes less power, has a simpler design, and is scalable with consistently high performance.

SUMMARY

The disclosed embodiments provide a register scoreboard for a processor with a time counter and provides a method of using the register scoreboard for statically dispatching instructions to an execution pipeline with preset execution times based on a time count from the time counter.

Disclosed herein is an approach to microprocessor design employing the static scheduling of instructions. The disclosed static scheduling operation is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependency, (2) availability of read buses to read data from the register file, (3) availability of a functional unit to execute the instruction, and (4) availability of a write bus to write result data back to the register file.

All the above requirements are associated with time: (1) a time when all data dependencies are resolved, (2) at which time the read buses are available to read source operands from a register file, (3) at which subsequent time the functional unit is available to execute the instruction, and (4) at which further subsequent time the write bus is available to write result data back to the register file.

In one embodiment, a time counter increments every clock cycle and the resulting count is used to statically schedule instruction execution. Instructions have known throughput and latency times, and thus can be scheduled for execution based on the time count. For example, an add instruction with throughput and latency time of 1 can be scheduled to execute when the data dependency is resolved. If the time count is 5 and the add has no data dependency at time 8, then the available read buses are scheduled to read data from the register file at time 8, the available arithmetic logic unit (ALU) is scheduled to execute the add instruction at time 9, and the available write bus is scheduled to write result data from ALU to the register file at time 9. The add instruction is dispatched to the ALU execution queue with the preset execution times. The read buses, the ALU, and the write bus are scheduled to be busy at the preset times. The maximum time count is designed to accommodate the largest future time to schedule execution of particular instruction. In some embodiments, the time count is 64 and no instruction can be scheduled to execute more than 64 cycles in the future. In another embodiment, an overflown bit is added to the register scoreboard to allow writing back to the register file at a write time greater than 64 cycles.

In another embodiment, a superscalar microprocessor with quad-issue can have 256 instructions in the execution pipeline. With static scheduling of instructions based on the time count, the complexity of dynamic scheduling is eliminated, the arbitration of resources is reduced, and the hundreds of comparators for data dependency are eliminated. The basic out-of-order execution of instructions is the same, but static scheduling of instructions with a time count is more efficient. The elimination of the extra components means the processor consumes less power. Instructions are efficiently executed out-of-order with preset times to retain the performance compared to traditional dynamic approaches. The number of issued instructions is scalable from scalar to superscalar.

In one embodiment a processor includes a register scoreboard which stores write-back times for registers where the write-back time is referenced to a time count incremented every clock cycle representing a current time of the processor. An instruction issue unit receives a first instruction and issues the first instruction with a preset execution time based on the read after write (RAW) data dependency from the register scoreboard. An execution queue receives the first instruction from the instruction unit and dispatches the first instruction to a functional unit when the preset execution time is the same as the time count.

BRIEF DESCRIPTION OF THE DRAWINGS

Aspects of the present invention are best understood from the following description when read with the accompanying figures.

FIG. 3 is a block diagram illustrating a time-resource matrix;

DETAILED DESCRIPTION

Figure 1:
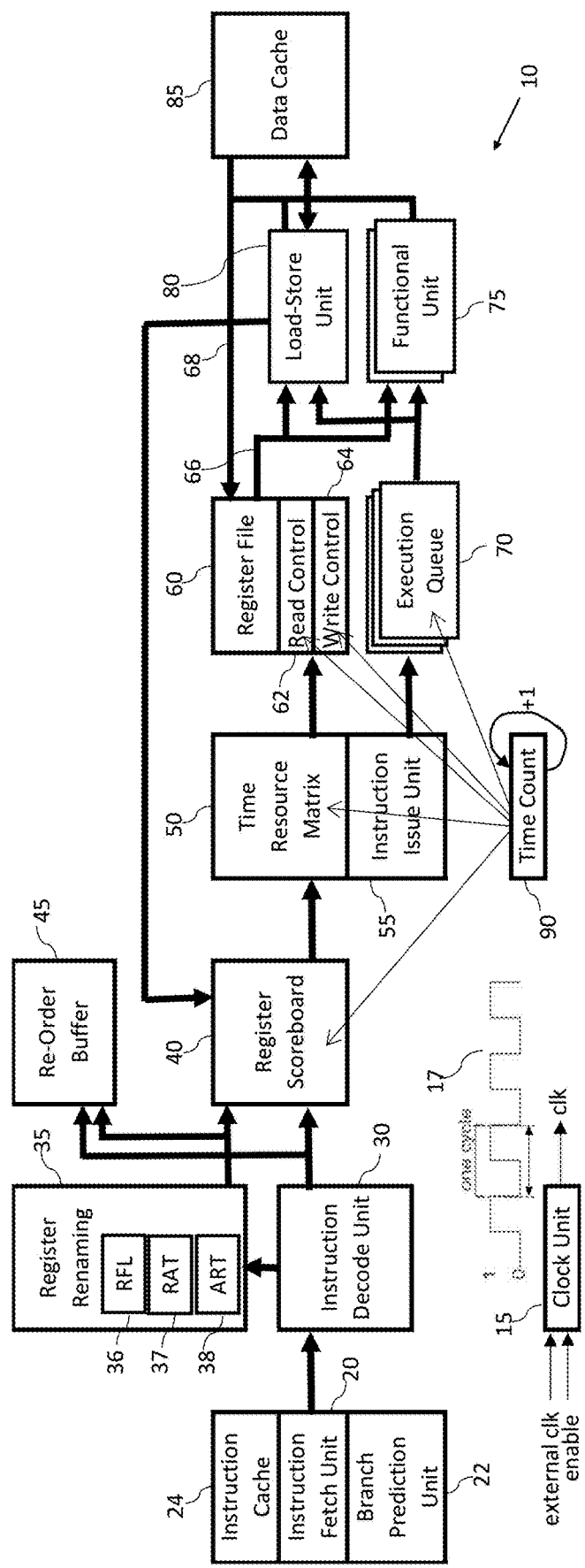
FIG. 1 is a block diagram illustrating a processor based data processing system in accordance with the present invention.

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment, a processor is provided, typically implemented as a microprocessor, that schedules instructions to be executed at a preset time based on a time count from a time counter. In such a microprocessor, the instructions are scheduled to be executed using the known throughput and latency of each instruction to be executed. For example, in one embodiment, the ALU instructions have throughput and latency times of 1, the multiply instructions have throughput time of 1 and the latency time of 2, the load instructions have the throughput time of 1 and latency time of 3 (based on a data cache hit), and the divide instruction have throughput and latency times of 32.

FIG. 1 is a block diagram of a microprocessor based data processing system. The exemplary system includes a microprocessor 10 having a clock unit 15, an instruction fetch unit 20, an instruction cache 24, a branch prediction unit 22, an instruction decode unit 30, a register renaming unit 35, a register scoreboard 40, a re-order buffer 45, a time-resource matrix 50, an instruction issue unit 55, a register file 60, a read control unit 62, a write control unit 64, a plurality of execution queues 70, a plurality of functional units 75, a load-store unit 80, and a data cache 85. The microprocessor 10 includes a plurality of read buses 66 from the register files to the functional units 75 and load-store unit 80. The system also includes a plurality of write buses 68 to write result data from the functional unit 75, the load-store unit 80, and the data cache 85 to the register file 60. The microprocessor 10 is a synchronous microprocessor where the clock unit generates a clock signal ("clk") which couples to all the units in the microprocessor 10. The clock unit 15 provides a continuously toggling logic signal 17 which toggles between 0 and 1 repeatedly at a clock frequency. Clock output signal ("clk") of clock unit 15 operates to synchronize many different units and states in the microprocessor 10. The clock signal clk is used to sequence data and instructions through the units that perform the various computations in the microprocessor 10. The clock unit 15 may include an external clock as input to synchronize the microprocessor 10 with external units (not shown). The clock unit 15 may further include an enable signal to disable the clock unit when the microprocessor is in an idle stage or not in use for instruction execution.

According to an embodiment, the microprocessor 10 also includes a time counter unit 90 which stores a time count incremented, in one embodiment, every clock cycle. The time counter unit 90 is coupled to the clock unit 15 and uses the "clk" signal to increment the time count.

In one embodiment, the time count represents the time in clock cycles when an instruction in the instruction issue unit 55 is scheduled for execution. For example, if the current time count is 5 and an instruction is scheduled to be executed later in 22 cycles, then the instruction is sent to the execution queue 70 with the execution time count of 27. When the time count increments to 26, the execution queue 70 issues the instruction to the functional unit 75 for execution in the next cycle (time count 27). The time counter unit 90 is coupled to the register scoreboard 40, the time-resource matrix 50, the read control 62, the write control 64, and the plurality of execution queues 70.

The scoreboard 40 resolves data dependencies in the instructions. The time-resource matrix 50 checks availability of the various resources, which in one embodiment include the read buses 66, the functional units 75, the load-store unit 80, and the write buses 68. The read control unit 62, the write control unit 64, and the execution queues 70 receive the scheduled times from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time. The execution queue 70 is set to dispatch an instruction to a functional unit 75 or the load-store unit 80 at a preset time. In each case, the preset time is the time determined by the instruction issue unit 55. The preset time represents a future time based on the time count, so when the time count counts up to the preset time, then the specified action will happen. The specified action can be reading data from the register file, writing data to the register file, issuing an instruction to a functional unit for execution, or some other action. The instruction decode unit 30 determines when an instruction is free of data dependencies and the resource is available. This allows it to set the "preset time" for the instruction to be executed in the execution pipeline.

In the microprocessor system 10, the instruction fetch unit 20 fetches the next instruction(s) from the instruction cache 24 to send to the instruction decode unit 30. One or more instructions can be fetched per clock cycle from the instruction fetch unit 20 depending on the configuration of microprocessor 10. For higher performance, microprocessor 10 fetches multiple instructions per clock cycle for the instruction decode unit 30. For low-power and embedded applications, microprocessor 10 might fetch only a single instruction per clock cycle for the instruction decode unit 30. If the instructions are not in the instruction cache 24 (an occurrence commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit 20 is also coupled with the branch prediction unit 22 for prediction of the next instruction address when the branch is detected and predicted by the branch prediction unit 22. The instruction fetch unit 20, the instruction cache 24, and the branch prediction unit 22 are described here for completeness of a microprocessor 10. In other embodiments, other instruction fetch and branch prediction methods can be used to supply instructions to the instruction decode unit 30 for microprocessor 10.

The instruction decode unit 30 is coupled to the instruction fetch unit 20 for new instructions and also coupled to the register renaming unit 35 and the register scoreboard 40. The instruction decode unit 30 decodes the instructions to identify instruction type, instruction throughput and latency times, and the register operands. The register operands, for example, may consist of 2 source operands and 1 destination operand. The operands are referenced to registers in the register file 60. The source and destination registers are used here to represent respectively the source and destination operands of the instruction. In one embodiment, source registers support solving read-after-write (RAW) data dependencies. If a later instruction has the same source register as the destination register of an earlier instruction, then the later instruction has RAW data dependency. In such an instance, the later instruction must await completion of the earlier instruction before it can start execution.

Other data dependencies for the instructions include the write-after-write (WAW) and write-after-read (WAR) dependencies. The WAW data dependency occurs when 2 instructions write back to the same destination register. The WAW dependency restricts the later instruction from writing back to the same destination register before the earlier instruction is written to it. To avoid the WAW dependency, every destination register is renamed by the register renaming unit 35 where the later instruction is written to a different register from the earlier register, thus eliminating the WAW data dependency. The register renaming unit 35 also eliminates the WAR data dependency where the later instruction cannot write to a register until the earlier instruction reads the same register. Since the destination register of the later instruction is renamed, the earlier instruction can read the register at any time. As the destination registers are renamed, the instructions may be executed out-of-order and written back to the renamed destination register out-of-order. The register scoreboard 40 is used to keep track of the completion time of all destination registers. In one embodiment, the completion time is maintained in reference to the time count 90.

In one embodiment, the register renaming unit 35 consists of the register free list (RFL) 36, the register alias table (RAT) 37, and the architectural register table (ART) 38. In one embodiment, the ART 38 tracks 32 architectural registers which being renamed by the additional 64 temporary registers. In other words, such an embodiment supports renaming of each of the 32 architectural registers. In such an embodiment, the register scoreboard 40 keeps the write back time for 96 total registers (32 architectural registers plus 64 temporary registers). The register free list 36 keeps track of temporary registers which have not been used. As the destination register of the instruction is renamed, the free-list register is used for the renaming. The register alias table 37 is the latest renamed register of the architectural register. For example, if register R5 is renamed to temporary register R52, then the register alias table 37 stores the renaming of R5 to R52. Thus any source operand which references to R5 will see R52 instead of R5. As the architectural register R5 is renamed to R52, eventually when register R52 is retired, the architectural register R5 becomes R52 as it is stored in the architectural register table 38. The ART 38 is referred to the architectural registers at the retire stage of the instructions. In the above example, R5 is renamed to R52 in the instruction decode stage which updates the RAT 37 immediately. The instruction with destination registers R5/R52 is recorded in the re-order buffer 45 in the instruction order. The instruction will be executed in the functional unit 75 and will write back to R52 of the register file 60 and will set the completion status corresponding to the instruction in the re-order buffer 45. Completed instructions are retired in-order from the re-order buffer 45 and upon completion of the instruction the ART 38 keeps the renaming of R5 to R52 and releases R5 to the RFL 36. If the instruction stream is interrupted, then R52 is the architectural register that corresponds to R5 and the corresponding entry in the ART 38 will be copied to RAT 37. RAT 37 contains the speculative copy of the architectural registers at the decode stage and ART 38 contains the non-speculative of the architectural registers when the instructions are retired.

In one embodiment, if instructions are executed out-of-order, then the re-order buffer 45 is needed to ensure correct program execution. The register renaming 35 and the instruction decode unit 30 are coupled to the re-order buffer 45 to provide the order of issued instructions and the latest renaming of all architectural registers. The re-order buffer 45 is needed to retire the instructions in order regardless of when the instructions are executed and written back to the register file 60. The re-order buffer 45 takes the form of a FIFO which receives inputs that are instructions from the decode unit 30 and provides outputs in the form of instructions that are retired in-order after completion by the functional unit 75 or the load store unit 80. In particular, the re-order buffer 45 flushes all instructions after a branch misprediction or instruction exception. The architectural register table 38 is updated only with the instructions that occur before the branch misprediction or instruction exception. Another important function of the re-order buffer 45 is writing to data memory only under the order of the load and store execution. In one embodiment, the data memory (including data cache 85 and external memory) are written in-order by retiring of the store instructions from the re-order buffer 45.

Each of the units shown in the block diagram of FIG. 1 can be implemented in integrated circuit form by one of ordinary skill in the art in view of the present disclosure. With regard to one embodiment of this invention, time counter 90 is a basic N-bit wrap-around counter incrementing by 1 every clock cycle. The time-resource matrix 50 is preferably implemented as registers with entries read and written as with a conventional register structure.

Figure 2:
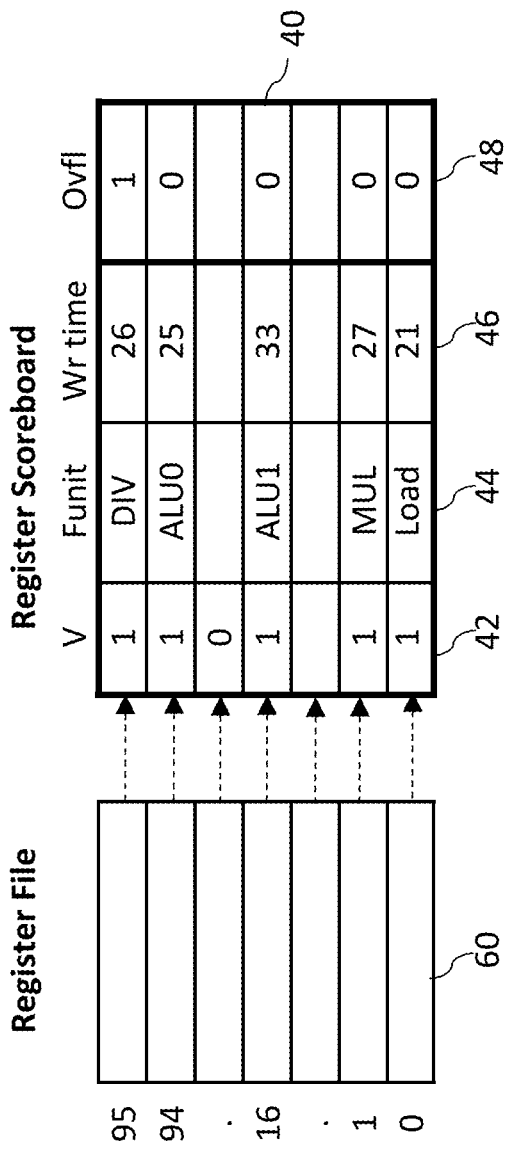
FIG. 2 is a block diagram illustrating a register file and a register scoreboard.

FIG. 2 illustrates the register file 60 and the register scoreboard 40. In one embodiment, the register file 60 has 96 registers, numbered as registers 0 to 95 as illustrated. The register file 60 consists of all physical registers of the processor 10. Each register in the register file 60 has a corresponding entry in the register scoreboard 40. The register scoreboard 40 stores the pending write status for the registers in the register file 60. A valid bit field 42 indicates a valid write back to the register file 60 at a future time in reference to the time count 90, as specified by the write time field 46 from a specific functional unit in the "Funit" field 44. As examples illustrated in FIG. 2, register 0 is written back at time count 21 from the load-store unit 80. Register 1 is written back at time count 27 from the multiply unit (one of the functional units 75). Register 16 is written back at time count 33 from the ALU1, (another of the functional units 75), etc. as illustrated in FIG. 2. In one embodiment, the overflown indication in the "Ovfl" field 48 indicates that the write time is greater than 64 as illustrated in FIG. 2 for register 95 with "1" for the overflown bit. The write time 46 is the time in reference to the time count 90. The result data is written to the register file 60. The data is not available from the register file 60 until the clock cycle following the write to the register file 60 but the result data can be forwarded from the functional unit 44 indicated in the register scoreboard 40. For example, if the value of the time count 90 is 19, then the load-store unit 80 produces the result data in 2 clock cycles for writing back to register 0 of the register file 60. In the example shown in FIG. 2 register 95, the write time from the divide unit occurs 71 cycles from the time count of 19 thus the write time of 26 and the overflown bit of 1 are written to register 95 as illustrated in FIG. 2. The write back time from the functional unit is based on the known latency time of an instruction. The latency time of a load instruction is not fixed. The latency time of a load instruction can be unpredictable as the load data may not be in the data cache 85. For a data cache miss, the data must be fetched from external memory as described above. In such an instance, the write back time in the scoreboard 40 for the destination register of a load instruction will be no longer correct. If processor 10 is implemented with a level 2 cache (not shown), then the latency time for a level 2 cache hit can be used to update the write time 46 of the register scoreboard 40.

In one embodiment, the latency time of the divide instruction can be a large number. Ideally, the time count 90 should be set with a maximum time count larger than the latency time of the divide instruction. Taking into account the execution time of the divide instruction with respect to the time count 90, the write time of the divide instruction can be a value that is greater than the maximum value of the time counter. It is generally important to not stall any instruction in the instruction issue unit 55. In one embodiment, the divide instruction can be issued with a write back time greater than the maximum time count and subsequent dependent instructions may be stalled in the instruction issue unit 55 since the time-resource matrix 50 is set for only the maximum time count 90. Any subsequent dependent instruction(s) will be stalled in the instruction issue unit 55 until the overflown bit is reset. In general, it may not be necessary to schedule instructions with that many cycles in advance as many compilers will operate to put the dependent instructions many cycles after the divide instruction.

The write time of a destination register is the read time for the subsequent instruction with RAW data dependency on the same destination register. Referring back to FIG. 1, the source registers of an instruction in the instruction decode unit 30 access the register scoreboard 40 for the corresponding read times. If the valid bit 42 of a source register is not set in the register scoreboard 40, then the data in the register file 60 can be accessed at any time providing availability of the read buses 66, otherwise the write time 46 of the prior instruction is the earliest time to issue an instruction. The write time 46 is when the result data from the functional unit 75 or the load store unit 80 are on the write bus 68 to the register file 60. The result data from write bus 68 can be forwarded to read bus 66 so that the result data is available on the read bus 66 in the same clock cycle in which it is written to the register file 60. In one embodiment, the "Funit" field 44 indicates which functional unit will write back to the register file 60, and the designated functional unit can restrict the aforementioned forwarding to the read bus 66 due to presence of a critical timing path. For example, the data from the data cache is a critical timing path in which case forwarding is performed in one embodiment to only the ALUs. If the issued instruction is multiply, then the write time 46 from load store unit 80 should be incremented by 1 to be used as the read time for the multiply instruction. In such an instance, the multiply instruction reads the data from the register file 60 one cycle after the load data is written to the register file 60. Forwarding of data from the data cache 85 to the ALU is normal and is the same as forwarding of any functional unit to any functional unit, while forwarding of data from data cache 85 to multiply unit is not allowed. As an example, when the ALU instruction reads the register 0 of the register scoreboard 40 in FIG. 2, the write time 46 of 21 is used as the read time as data can be forwarded from the data cache 85 onto read bus 66. When the multiply instruction reads the same register 0 of the register scoreboard 40 in FIG. 2, the read time of 22 is used to read data from the register file 60 as the data from data cache 85 are written into the register file 60 in cycle 21. This same restriction is kept and does not permit the read control unit 62 to forward the load data from the data cache 85 to the multiply unit.

An instruction reads source operand data at read time, executes the instruction with a functional unit 75 at execute time, and writes the result data back to the register file 60 at write time. The write time for each instruction is recorded in the write time field 46 of the register scoreboard 40. With 2 source registers, a given instruction selects the later write time, of the two source registers, from the register scoreboard 40 as the read time for the instruction. The execute time is the read time plus 1 time count where the functional unit 75 or the load-store unit 80 starts executing the instruction. The write time of the instruction is the read time plus the instruction latency time. If the instruction latency time is 1 (e.g., an ALU instruction), then the write time and execution time of the instruction are the same.

Each instruction has an execution latency time. For example, in one embodiment, the add instruction has a latency time of 1, the multiply instruction has a latency time of 2, and the load instruction has a latency time of 3 assuming a data cache hit. In another example, if the current time count is 5 and the source registers of an add instruction receive write time counts of 22 and 24 from the register scoreboard 40, then the read time count is set at 24. In this case, the execution and the write time counts are both 25 for the add instruction. As shown in FIG. 1, the register scoreboard 40 is coupled to the time-resource matrix 50 which provides the read, execute, and write times of an instruction to determine availability of resources for each instruction.

FIG. 3 illustrates further details of the time-resource matrix 50. The time-resource matrix 50 preferably includes the same number of time entries to match the time counter 90. For example, if the time counter 90 is 128 cycles, then the time-resource matrix 50 has 128 entries. In one embodiment, the time counter 90 is incremented every clock cycle and rotates back from the 127th entry to the 0th entry. The columns in the time-resource matrix 50 represent the available resources for the read buses 51, the write buses 52, the ALUs 53, the load-store ports 56, the multiply unit 57, the divide unit 58, and the branch execution unit (BEU) 59. If other functional units are provided by microprocessor 10 those are also included in the resource matrix 50.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, and the branch execution unit column 59 each correspond to one of the plurality of functional units 75 of FIG. 1. The load-port ports column 56 corresponds to the load-store unit 80 of FIG. 1.

FIG. 3 also shows an example of the information in the time-resource matrix 50. Shown is data with a read time count of 24, an execution time count of 25, and a write time count of 25. When an instruction accesses the time-resource matrix 50 for availability of resources, the matrix 50 shows that at read time 24, there is 1 available read bus, and at execution time 25, there are 2 available ALUs, 1 load-store port, 1 multiply unit, and 1 BEU for execution of instruction. At write time 25, there are 2 available write buses.

All available resources for a required time are read from the time-resource matrix 50 and sent to the instruction issue unit 55 for a decision of when to issue an instruction to the execution queue 70. If the necessary resources are available at the required times, then the instruction can be scheduled and sent to the execution queue 70. The issued instruction updates the register scoreboard 40 with the write time and updates the time-resource matrix 50 to correspondingly reduce the available resource values. All resources must be available at the required time counts for the instruction to be dispatched to the execution queue 70. If all resources are not available, then the required time counts are incremented by one, and the time-resource matrix is checked as soon as the same cycle or next cycle to determine if the necessary resources are available. The particular number of read buses 66, write buses 68, and functional units 75 in FIG. 1 is preferably chosen to minimize stalling of instructions in the instruction issue unit 55.

Figure 4:
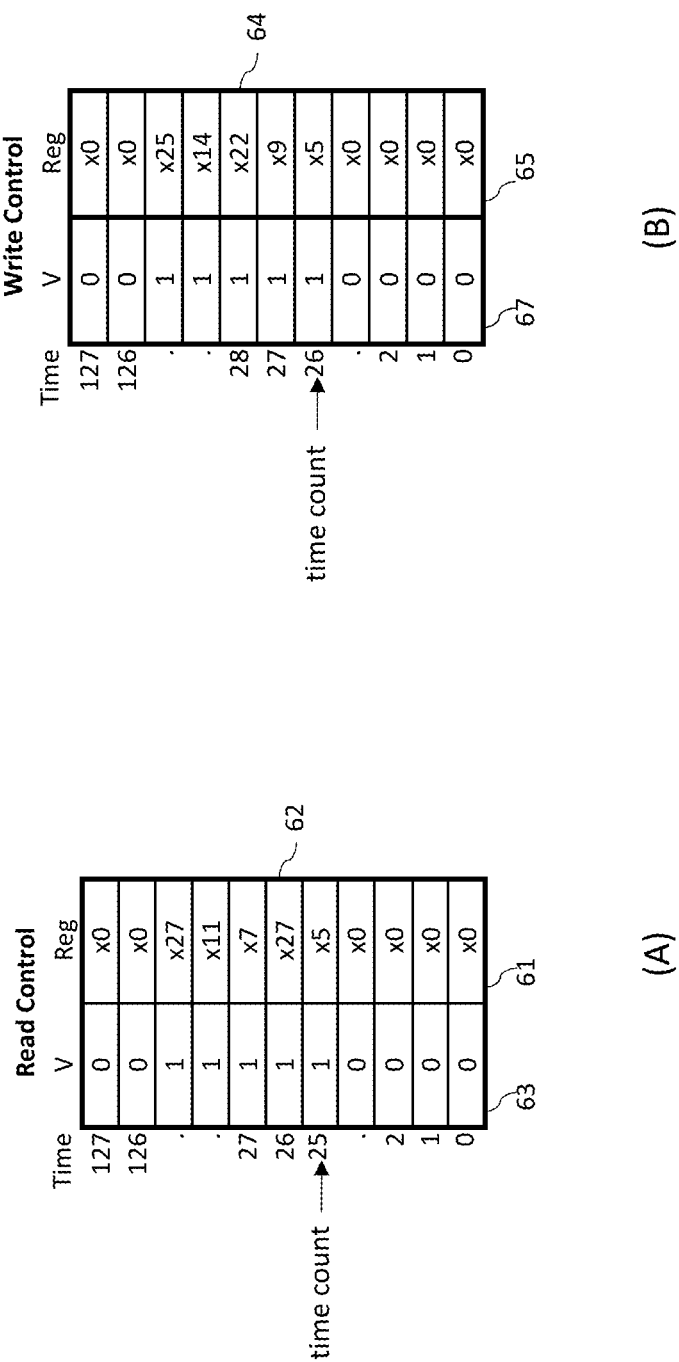
FIGS. 4A and 4B are block diagrams illustrating a read bus control and a write bus control.

FIG. 4A illustrates a single read bus as controlled by the read control unit 62 and FIG. 4B a single write bus as controlled by the write control unit 64. The read control unit 62 and the write control unit 64 include a number of time entries to match the time counter 90. As mentioned above, in a preferred embodiment the time count is incremented every clock cycle. The columns in the read control unit 62 represent the source register 61 and a valid bit 63. The columns in the write control unit 64 represent the destination register 65 and a valid bit 67 in the write bus 65.

In the example illustrated in FIGS. 4A and 4B, at the time count of 25 in the read control unit 62 the register x5 from the register field 61 of the read control 62 is used to read the entry 5 from the register scoreboard 40 for the "Wr time" 46 and the "Funit" 44. If the write time 46 is the same as the time count 90, then the result data is written back to the register file 60 in the same clock cycle. The result data from the "Funit" 44 can be forwarded to the read bus 66 by the "Funit" 44 instead of being read from the register file 60. The write time 46 may have changed due to a cache miss of the load instruction, in which case the instruction cannot be executed yet because the source operand data is not valid. The RAW dependent instruction is rescheduled to be executed at a later time. In the next cycle, when the time count is 26, the register x27 from the register field 61 is used to read from the register file 60. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 operates to provide centralized control for the read buses 66, thus reducing complexity from the hundreds of instructions in dynamic scheduling architectures.

Similarly in FIG. 4B, the register x5 from the register field 65 of the write control unit 64 at time count of 26 is used to write to the register file 60. The register x5 will also access the "Funit" 44 of the register scoreboard 40 to get the result data from a specific functional unit 75. Again, the execution queues 70, the functional units 75, and the write control unit 64 are synchronized to transfer result data on a write bus 68 to write to the register file 60. In one embodiment, the valid (valid bit field 67) register 65 of write control unit 64 is responsible to clear the valid bit 42 from the register scoreboard 40 of FIG. 2 if the corresponding "Wr time" field 46 is the same as the time count 90. It is possible that the write time 46 of the register scoreboard 40 has been modified due to delay in write time. An alternative is to compare the current time count to all "Wr time" fields 46 of the register scoreboard 40 and to clear the valid bit 42 for matching times. This alternative results in higher power consumption if for example, there are 100 registers in the register scoreboard 40. In another embodiment, the time count 90 can match the "Wr time" field 46 of the register scoreboard 40 with the set overflown bit 48 in which case the overflown bit 48 is reset instead of resetting the valid bit 67 in FIG. 2. The write port valid bit 67 of the write control unit 64 remains set when the overflown bit 48 of the register scoreboard 40 is reset. The write port of write control unit 64 is used twice, the first time to clear the overflown bit 48 and the second time to clear the valid bit 42 of the register scoreboard 40. The first time, no data is written back to the register file 60. The write control unit 64 operates as a centralized control for the write buses 68 which removes complexity compared to distributing such control among the plurality of functional units in dynamic scheduling.

Figure 5:
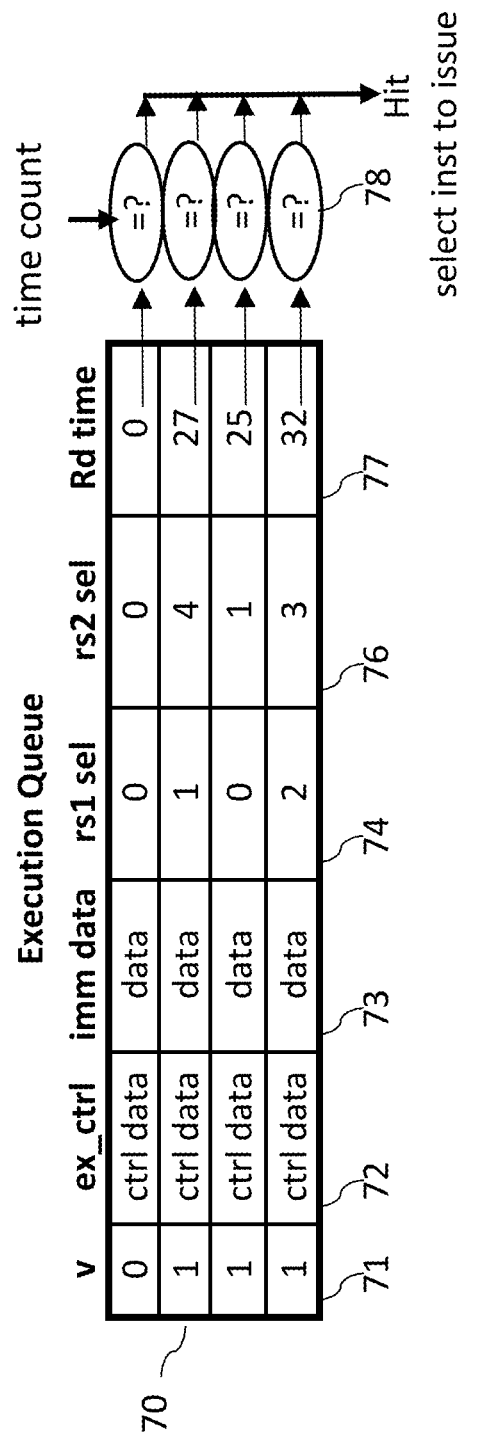
FIG. 5 is a block diagram illustrating an execution queue.

FIG. 5 illustrates an example of a 4-entry execution queue 70. The number of entries for the execution queue 70 is only an illustration. The invention is not limited to any number of execution queue 70 entries and the execution queue 70 could take the form of a single-entry execution queue. Each entry is an instruction awaiting execution by one of the functional units 75 or the load/store unit 80 according to the time count in the read time column 77. Each entry in the execution queue 70 preferably consists of the following fields: the valid bit 71, control data 72, the immediate data 73, the first source register select 74, the second source register select 76, and the read time 77. The valid bit 71, when set to "1," indicates that the entry is valid in the execution queue 70. The control data 72 specifies the specific operation to be used by the functional units 75 or the load/store unit 80. The immediate data 73 is an alternative to the second source register for the instruction. The valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The source register selects 74 and 76 may not be used for some instructions.

The read control 62 reads the register scoreboard 40 to ensure that the expected source operand data is still valid and is synchronized with the execution queue 70 to supply source data to the functional unit 75. If the write time 46 from the scoreboard 40 is modified to be greater than the time count 90, then the synchronized instruction in the execution queue 70 is replayed instead of going to the functional unit 75. In one embodiment, the replay instruction uses the new write time from the register scoreboard 40 to calculate the new read time, execution time, and write time for accessing the time resource matrix 50 to reissue the instruction. The procedure is the same as for instructions in the instruction issue unit 55.

Note that the destination register can be but does not need to be kept with the instruction. The write control unit 64 is responsible for directing the result data from a functional unit 75 to a write bus 68 to write to the register file 60. The execution queues 70 are only responsible for sending instructions to the functional units 75 or the load-store unit 80. The read time field 77 which has the read time of the instruction is synchronized with the read control unit 62. When the read time 77 is the same as the time count 90 as detected by the comparators 78, the instruction is issued to the functional units 75 or the load/store unit 80. For the example in FIG. 5, the entries are issued to the functional units out-of-order. The read time field 77 indicates that the second entry is issued at time count 25, the third entry is issued at time count 27, and the first entry is issued at time count 32.

In an embodiment, each functional unit 75 has its own execution queue 70. In another embodiment, an execution queue 70 dispatches instructions to multiple functional units 75. In this case, another field (not shown) can be added to the execution queue 70 to indicate the functional unit number for dispatching of instructions.

Referring back to FIG. 1, the execution queues 70 are coupled to the load store unit (LSU) 80 and the functional units 75. The execution queues 70 issue the instructions to the functional units 75 or the load/store unit 80 when the read times 77 are the same as the time count 90. If the instruction is a load/store, then it is dispatched to the LSU 80, else it is dispatched to one of the functional units 75. The LSU 80 and functional units 75 are also coupled to the read buses 66 and write buses 68 to access the register file 60. The source operand data are fetched from register file 60 and transported on read buses 66 to the LSU 80 and functional units 75. The result data from the LSU 80 and functional units 75 are transported on write buses 68 to write to destination registers in the register file 60. The LSU 80 is also coupled to the data cache 85. The LSU 80 executes the load and store instructions to read and write data from the data cache 85. If the data are not in the data cache 85, then the cache miss causes that cache line to be fetched from external memory (not shown). Typically, the functional units 75 perform different operations, e.g., ALU, multiply, divide, branch, etc. In other embodiments, the functional units 75 perform the same function, for example, multiple ALUs. Furthermore, the invention is not limited to integer functional units. In other embodiments the functional units include floating point units, digital-signal processing units, vector processing units, or custom designed units.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A processor comprising:
a time counter storing a time count representing a current time of the processor, wherein the time count is incremented periodically;
a register scoreboard coupled to the time counter to record a write back time of a destination register referenced by a first instruction; and
an instruction issue unit coupled to the register scoreboard for receiving a second instruction, wherein a source register referenced by the second instruction is the same as the destination register referenced by the first instruction, and the instruction issue unit issues the second instruction with a preset execution time based on the write back time of the destination register referenced by the first instruction; and
an execution queue coupled to the time counter and the instruction issue unit to receive the second instruction from the instruction issue unit, and dispatch the second instruction to a functional unit when the preset execution time corresponds to the time count.

2. The processor of claim 1 wherein:
the processor includes a clock circuit, and the time counter increments the time count with each clock cycle of the processor; and
the preset execution time is correlated to the time count based upon the clock cycle.

3. The processor of claim 2 wherein:
the time counter comprises an N-bit counter which counts from a zero count to an Nth-bit count value, which represents a largest future time for the instruction issue unit to issue an instruction; wherein
the N-bit counter returns to a the zero count after reaching the Nth-bit count value.

4. The processor of claim 1 further comprising a write control unit that operates to modify a write time of a register in the register scoreboard when the write time of the instruction in the execution queue to which the register is assigned or the functional unit to which the register is assigned is determined to be delayed.

5. The processor of claim 3 further comprising a time-resource matrix coupled to the register scoreboard and the time counter for storing information relating to available resources for each time count of the N-bit counter, and wherein the available resources include at least one of: a plurality of read buses, a plurality of write buses, and a plurality of functional units.

6. The processor of claim 5 wherein the instruction issue unit is coupled to the time resource matrix unit to receive data therefrom to issue a particular instruction if all the resources indicated in the time-resource matrix for the particular instruction are available, and to stall the instruction if any of the resources indicated in the time-resource matrix for the particular instruction is not available.

7. The processor of claim 3 further comprising a read control unit storing a plurality of time count entries and each of the time count entries identifying a source register that provides a source operand provided by the read unit control on a read bus at the corresponding time count entry.

8. The processor of claim 7 wherein the source register designated by the read control unit accesses the register scoreboard to determine availability of the source register, the read control unit operating, if the write time of the particular register is the same as the time count, to cause the data to be forwarded by the register file to the source register instead of reading from the register file.

9. The processor of claim 8 wherein for a subset of instructions executed by the processor the read control unit is not permitted to forward data from a functional unit to the source register in the event that the write time of the particular register is the same as the time count.

10. The processor of claim 8 wherein for a subset of the functional units the read control unit is not permitted to forward data from a functional unit to the source register in the event that the write time of the particular register is the same as the time count.

11. The processor of claim 8 further comprising a write control unit storing a first register of a register file with time count entries to indicate when result data are transported from a write bus and written to the first register.

12. The processor of claim 11 wherein the write bus control unit accesses the register scoreboard with the register from the write control unit to clear a valid bit that when set indicates that the write time of the register from the write control unit is valid if the write time of the register is the same as the time count.

13. The processor of claim 12 wherein the execution queue stores a plurality of instructions wherein each instruction includes a read time corresponding to a future time based on the time count.

14. The processor of claim 13 wherein the read control unit is synchronized with the read time in the execution queue, where the instruction in the execution queue may be replayed if the write back time of the source operand has been delayed.

15. The processor of claim 13 wherein the execution queue dispatches instruction to at least one functional unit.

16. The processor of claim 12 wherein the register scoreboard further includes an overflown bit that when set represents the write time greater than the N-bit counter time, the processor operating to access the register scoreboard with the register from the write unit control to clear the overflown bit if the write time of the register is the same as the time count.

17. A processor comprising:
a clock circuit;
a time counter storing a time count representing a current time of the processor, wherein the time count is incremented with each cycle of the clock circuit;
an instruction issue unit coupled to the time counter for receiving a first instruction, and issuing a first instruction with a preset execution time based on the time count; and
a register scoreboard storing a write time of a selected register from a plurality of registers in a register file, wherein the write time represents a future time relative to the time count;
an instruction decode unit coupled to the register scoreboard, the instruction decode unit reading a write time for each source operand of the first instruction from the register scoreboard, and using the write times corresponding to the first instruction to determine an execution time for the first instruction;
a time-resource matrix coupled to the register scoreboard and the time counter for storing information relating to available resources for each time count of the time counter, and
an execution queue coupled to the time counter and the instruction issue unit to receive the first instruction from the instruction decode unit, and dispatch the first instruction to a functional unit when the preset execution time is correlated to the time count and source register associated with the first instruction is indicated by the register scoreboard as being valid or replay the first instruction if the write time of the source register in the register scoreboard is no longer correlated with the time count;
wherein the available resources include at least one of: a plurality of read buses, a plurality of write buses, and a plurality of functional units.

18. A method executed within a processor for reading a register scoreboard for write times of registers in a register file comprising:
determining an execution time of an instruction;
issuing the instruction to an execution queue in a processor to execute at the execution time wherein the write time is obtained from the register scoreboard;
wherein the execution time represents a time duration based on a time count from a time counter which is periodically incremented.

19. The method of claim 18 wherein the maximum time count value that the time counter can reach corresponds to the latest future time at which the instruction is able to be issued.

20. The method of claim 19 further comprising storing a write time of a register of a register file wherein the write time represents a future time based on the time count.

21. The method of claim 20 further comprising storing information corresponding to available resources for each time count in a time-resource matrix, wherein the resources comprise at least one of: a plurality of read buses, a plurality of write buses, and a plurality of functional units.

22. The method of claim 21 further comprising storing a first register of the register file in a read control unit, wherein the first register is read from the register file and transported on a read bus controlled by the read control unit which reads the register scoreboard to indicate availability of data in the first register.

23. The method of claim 22 further comprising storing an identifier of a second register of the register file in a write control unit wherein result data are transported from a write bus controlled by the write control unit and written to the second register of the register file.

24. The method of claim 23 further comprising storing a plurality of instructions in an execution queue wherein each instruction includes a read time based on the time count.

25. The method of claim 24 further comprising:
synchronizing the read time of the execution queue with the read control unit; and
including the determination of the availability of the register data and replaying the instruction if the register data is not available.

26. The method of claim 24, wherein the execution queue is configured to dispatch an instruction to a single functional unit or multiple functional units.

27. The method of claim 24, wherein the register scoreboard further includes an overflown bit associated with the write time greater than the N-bit counter time, the method further comprising accessing the register scoreboard with the register from the write control unit to clear the overflown bit if the write time of the register is the same as the time count.

* * * * *